United States Patent
Burkitt

(12) 
(10) Patent No.: US 6,195,348 B1
(45) Date of Patent: Feb. 27, 2001

(54) DYNAMIC REALTIME PROTOCOL FOR FACSIMILE AND THE LIKE

(75) Inventor: Nick Burkitt, San Jose, CA (US)

(73) Assignee: Dialogic Corporation, Parsippany, NJ (US)

( * ) Notice: Subject to any disclaimer, the term of this patent is extended or adjusted under 35 U.S.C. 154(b) by 0 days.

(21) Appl. No.: 09/012,075

(22) Filed: Jan. 22, 1998

(51) Int. Cl.[7] .................................................. H04L 12/56
(52) U.S. Cl. ........................ 370/356; 370/392; 358/431
(58) Field of Search .................................. 370/352, 353, 370/356, 389, 392, 428, 463; 358/431, 437, 438, 439, 442, 449, 466; 348/7, 12

(56) References Cited

U.S. PATENT DOCUMENTS

| | | | |
|---|---|---|---|
| 5,537,410 | * | 7/1996 | Li .......................................... 370/389 |
| 5,822,317 | * | 2/2000 | Shibata ................................. 370/395 |
| 5,867,230 | * | 2/2000 | Wang et al. .......................... 348/845 |
| 5,881,064 | * | 3/1999 | Lin et al. .............................. 370/395 |
| 5,901,191 | * | 5/1999 | Ohno .................................... 370/465 |
| 6,026,434 | * | 2/2000 | Kubota et al. ......................... 348/12 |
| 6,032,189 | * | 2/2000 | Jinzenji et al. ....................... 709/235 |

FOREIGN PATENT DOCUMENTS

26753 * 7/1997 (WO) .

* cited by examiner

Primary Examiner—Wellington Chin
Assistant Examiner—Frank Duong
(74) Attorney, Agent, or Firm—Kaplan & Gilman, L.L.P.

(57) ABSTRACT

An improved technique for transmitting facsimile images over a data network is described wherein a remote server is sent information indicative of the average effective information transmission rate. The average information transmission rate is maintained the same at the sending and receiving sides of the network in order to eliminate problems caused by the bursty nature of packetized communications through the data network.

19 Claims, 1 Drawing Sheet

DYNAMIC REALTIME PROTOCOL FOR FACSIMILE AND THE LIKE

TECHNICAL FIELD

This invention relates to data transmission, and more particularly to an improved facsimile protocol which permits facsimile machines, typically designed for use with circuit switched telephone connections, to operate more effectively when connected through packet switched data networks such as the Internet.

DESCRIPTION OF THE PRIOR ART

Facsimile machines have become standard in every office environment, with most offices having a plurality of such machines. Facsimile machines operate by encoding an image on a paper into a series of tones that are then transmitted over the telephone network. Standard facsimile protocols for effectuating communications between facsimile machines have been defined, and most facsimile machines operate using one or more such protocols.

When the protocols used by most facsimile machines were defined many years ago, virtually the only technique utilized for interconnecting facsimile machines was a circuit switched telephone connection. Such a circuit switched telephone connection establishes a dedicated circuit between a sending and a receiving facsimile machine. The protocols previously defined for facsimile machines therefore presuppose the existence of such a dedicated telephone circuit.

Recently, the Internet and other smaller packet data networks have become ubiquitous. With personal computers on virtually every desktop, communication of voice, data and images over data networks, and particularly the Internet, has become the norm rather than the exception. Additionally, many people have found it more convenient to send and receive faxes electronically, directly from their personal computers, rather than printing them out and feeding paper through a scanning fax machine. Most of these computers are connected to a data network such as the Internet. Accordingly, facsimile technology has evolved to the point where many facsimile transmissions are achieved over a packet data network rather than a dedicated circuit switched connection, and where one or both of the fax machines involved in the transmission is actually a computer.

A typical arrangement for sending facsimile images over the Internet is shown in FIG. 1 and comprises a sending facsimile machine 104 connected to a local server 102. The local server 102 is utilized to establish a connection with a remote server 103 over the Internet 101 using standard network protocols such as TCP\IP. The remote server 103 is connected to the remote (receiving) facsimile machine 105, intended to receive the facsimile image.

In operation, a telephone call is made from the sending facsimile machine 104 to the local server 102 and the facsimile image transmitted over such telephone connection in accordance with standard and conventional techniques. Indeed, the local facsimile machine 104 can not distinguish between the local server 102 and a conventional facsimile machine.

After receiving the information at local server 102, the image is transmitted through Internet 101 and stored at remote server 103. Subsequent to the termination of the data connection, the facsimile image is then sent to receiving facsimile machine 105 using a conventional facsimile protocol and telephone call as is well known in the art.

One problem is that the main advantage of facsimile, substantially instantaneous conveyance of a document from one place to another, is lost. Specifically, when a sender completes feeding the document through a sending facsimile machine, he can not be sure that the document has been received at the other end. The document may be stored for a substantial amount of time in the network, or may even get corrupted by the network, yet the user sending the document would not be aware of this for a substantial amount of time.

Utilizing public data networks with unpredictable delay characteristics to send and receive faxes in realtime has been heretofore impossible due to a set of problems not present in conventional facsimile systems which utilize circuit switched connections. One such problem created by the utilization of the data network 101 is the fact that packets of information experience varying delays as they are transmitted over the network. The varying delays introduce timing problems which may cause the transmission to not stay within the bounds defined by the facsimile standards. For example, there may be a large burst of data getting through the network very quickly followed by a large amount of time with no data at all. A typical fax machine will not be able to handle the large burst, and may also time out during the interval when there is no data at all. Thus, facsimile transmissions utilizing data networks are typically not accomplished in realtime.

It would be desirable to be able to have the facsimile transmitted in real time over the data network, and to thus have the data network transparent with respect to the facsimile. However, because of the variable delays, the facsimile image must be buffered.

Another problem introduced when one attempts to transmit facsimile images over data network in realtime is that caused by fill bits. Specifically, referring to FIG. 1, many of the bits transmitted from the sending facsimile 104 to the local server 102 are not representative of image data (i.e., image data bits) but instead are inserted into the data stream in order to maintain a substantially constant output bit rate from facsimile machine 104 during times that the facsimile machine 104 is performing tasks such as advancing the paper. Thus, the bit stream arriving at local server 102 comprises both data bits that actually represent the image to be transmitted as well as so-called fill bits, which are inserted only to keep the timing correct.

Prior to the local server transmitting the image to remote server 103, the fill bits are stripped and the data compressed. When the remote server 103 receives the data, there is no way to reconstruct the original bit stream since the fill bits have been lost. Accordingly, there is no known way to keep the average rate at which image data bits arrive into the system at local server 102 approximately the same as the rate at which data bits leave the system from remote server 103. This means that data may be transmitted from remote server 103 to receiving facsimile machine 105 much faster or slower than it is being sent from sending facsimile machine 104 to local server 102. Consequently, receiving facsimile machine 105 may experience data arriving too fast or too slow, and the image will not be correctly conveyed. The foregoing is still another reason that facsimile images transmitted over data networks are typically not accomplished in realtime.

In view of the above, there exists a need in the art for a facsimile system which can deliver images in substantially real time, while at the same time, operate over a data network such as the Internet.

SUMMARY OF THE INVENTION

The above and other problems of the prior art are overcome and a technical advance is achieved in accordance with the present invention which relates to an improved method and apparatus for transmitting facsimile images and the like over a data network. In accordance with the teachings of the present invention, a local server receives a facsimile image and converts it into a sequence of packets. Each packet is "tagged" with a value indicative of how long it actually took to receive the data bits representing the image information. The fill bits are then stripped and the data bits and the tag are transmitted over the Internet as a set of packets.

If a sequence of 100 bits arrived at a local server, which sequence included 80 image data bits and 20 fill bits, and such packet took 100 milliseconds to receive, the system would send the 80 bits only along with a tag indicating that those 80 image data bits took 100 milliseconds to receive at the local server.

At the remote server, the tags are read, thereby notifying the remote server of the average amount of time it is taking for the image data bits to be received by the local server from the sending facsimile machine. The remote server can then transmit the data to a receiving facsimile machine at substantially the same average rate, adding fill bits as needed and taking into account possible different rates of the sending and remote facsimile machines, respectively.

DETAILED DESCRIPTION OF THE PREFERRED EMBODIMENT

Figure 1:
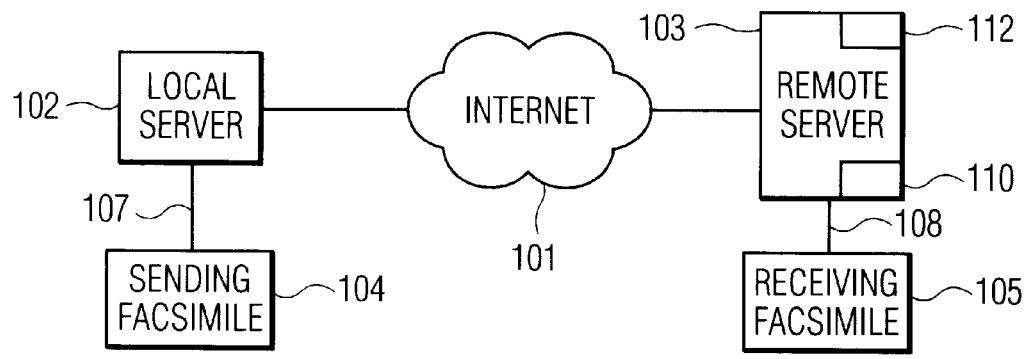
FIG. 1 shows a diagram indicating two exemplary facsimile machines communicating over the internet.

FIG. 1 shows a block diagram of two exemplary facsimile machines 104 and 105 arranged to communicate over Internet 101 through servers 102 and 103. The main components of FIG. 1 are known in the art, although the servers 102–103 must be modified, as described hereafter, to operate in accordance with the present invention.

As data is received at server 102, the data is reformatted and packetized. The reformatting involves compression as well as the addition of bits required by the network protocol implemented to communicate over network 101. As the information is reformatted, server 102 tags the data with a numeric indicator of the amount of time required to receive the original data, before reformatting, from sending facsimile machine 104. The tag represents the time required to receive the image data as well as any fill bits. The fill bits are then stripped prior to possible reformatting, compression and transmission over Internet 101 in packet form.

The data is transmitted through Internet 101 in accordance with standard network protocols such as TCP/IP and other techniques well known to those of ordinary skill in the art. When the data arrives at remote server 103, the remote server 103 immediately strips the header information. Such header information indicates conclusively the amount of time which the local server 102 took to receive the packet of facsimile information from the sending facsimile machine. This information can be in the form of a time period, an average bit rate, an average baud rate, etc. In any event, the information is interpreted by the remote server 103 and thus, remote server 103 can ascertain the time which it should use to transmit the bits to receiving facsimile machine 105.

The remote server 103 is responsible for compiling the received packets into a standard facsimile stream of information bits and sending such a stream to the receiving facsimile machine 105. Indeed, the receiving facsimile machine 105 has no way of distinguishing between the server 103 and a conventional facsimile machine. Accordingly, the server 103 must emulate a typical facsimile machine and must therefore eliminate all of the effects of the network 101. Therefore, when the information is reformatted back into a stream of facsimile information for conveyance to receiving facsimile machine 105, new fill bits are added in order to provide an effective average image bit rate equal to that indicated by the tag.

As the information is received at receiving server 103 it is compiled into a conventional stream of facsimile data, each packet is analyzed by the receiving server in order to ascertain the amount of time it took to be received by the receiving server. The receiving server then transmits the received stream of information in a standard facsimile form at a rate that is on average equal to the rate at which the facsimile information is received by the receiving server.

Figure 2:
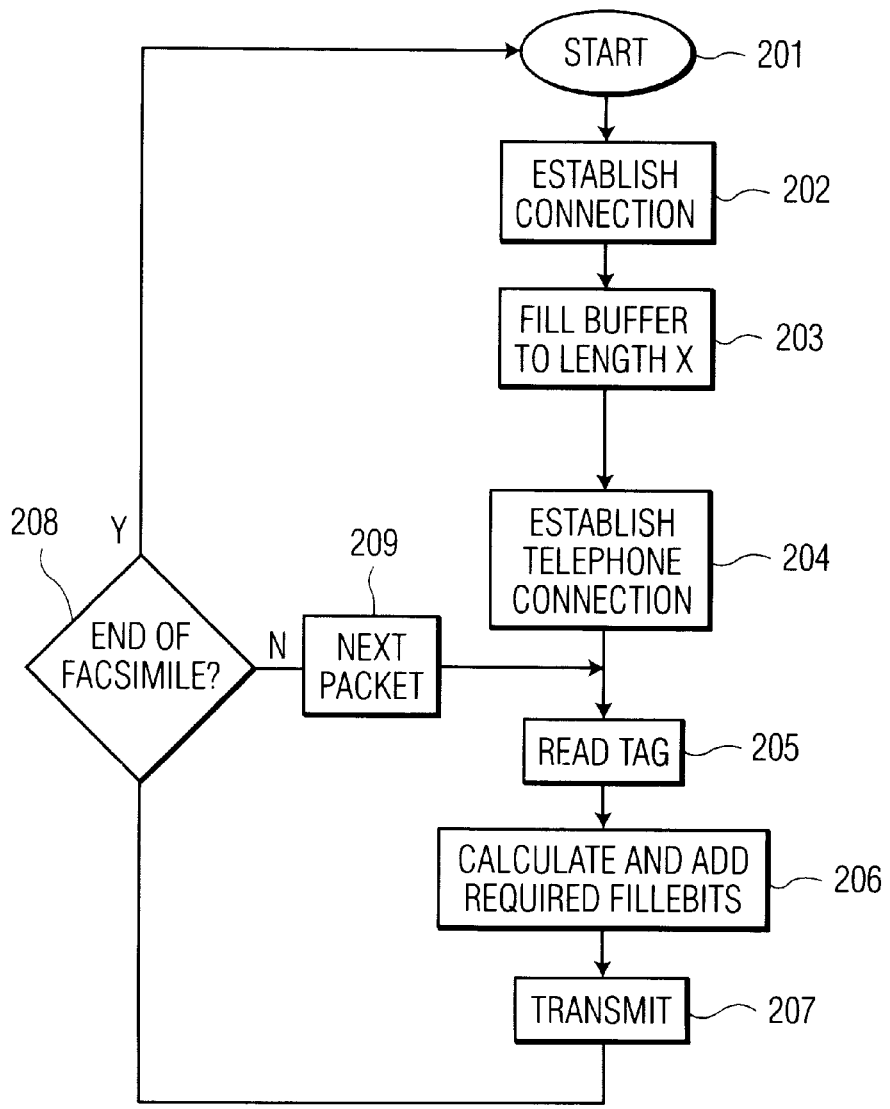
FIG. 2 shows a flowchart which may be used in implementing a novel Internet server in accordance with the teachings of the present invention.

FIG. 2 shows a flow chart of an algorithm which may be implemented in remote server 103 in order to implement the techniques of the present invention. The flow chart in FIG. 2 may be implemented in any software language by an ordinarily skilled programmer.

The server is entered at block 201 and a connection is established in box 202 between remote server 103 and local server 102. The details of establishing such a connection are well known to Internet users and providers and will not be described in detail herein.

Upon establishing the connection, the facsimile data is sent from local server 102 to remote server 103. The remote server 103 fills a buffer of length x with the data before beginning transmission to receiving facsimile machine 105. X is determined in accordance with the techniques previously described.

A telephone connection between remote server 103 and receiving facsimile machine 105 is established at block 204. It is also noted that the telephone connection may be established prior to the buffer being filled to length x. Once the connection is established at block 204, there exists an end to end connection between facsimile machines 104 and 105. Each facsimile machine believes it is connected through a circuit switched connection to the other. Neither facsimile machine is aware in any way that there is a packet switched connection conveying most of the data.

As packets arrive from Internet 101 to remote server 103, each tag is read and the data is then reformatted to place it back into a stream of facsimile information. Such reformatting may involve coding the data in a totally different manner than that used on the Internet 101. At block 206, the remote server calculates and adds the required number of fill bits. The fill bits depend upon the tag which indicated the amount of time to receive such bits, as well as the baud rate of the receiving facsimile machine 105. For example, if the tag showed that 80 image data bits were received in 100 milliseconds, the remote server 103 will ensure that the 80 image bits are also transmitted to receiving facsimile machine 105 in 100 milliseconds. This may be accomplished by adding fill bits if necessary. Additionally, the number of fill bits to accomplish this objective may be different from the number of fill bits initially added by sending facsimile machine 104, because the baud rate of receiving facsimile machine 105 may be the same or different from sending facsimile machine 104.

Once the appropriate number of fill bits, if any, are added, the bit stream is transmitted at block 207 as a standard facsimile information stream. If there is more data to be sent, then decision point 208 will return to read the tag of the next received packet. It is noted that the length of the buffer x is maintained substantially constant. If the remote server determines that the buffer length is beginning to diminish so much that it may run out of information, then the "throttle" is increased. Specifically, additional fill bits are added to slow down the effective image data transmission rate from remote server 103 to receiving facsimile machine until the buffer can return to a length at or above x. Alternatively, if the size of the buffer begins to increase too much, then the throttle is decreased and the fill bits which would otherwise be added in accordance with the foregoing description are not so added. This results in an effective image data transmission rate over line 108 which is faster than the image data transmission rate over line 107. Accordingly, the buffer size tends to decrease towards x.

By conveying the amount of time required to transmit image data bits between sending facsimile machine 104 and local server 102, the buffer length can be maintained relatively constant, and the average bit rate over line 108 can be maintained to be the same as that over line 107.

The above describes the preferred embodiment of the invention It will be apparent to those of ordinary skill in the art that various modifications or additions may be made. For example, the invention has application outside of facsimile, and may be utilized anywhere that a relatively constant bit rate is desired but a packet switched network with variable delays is utilized to convey the data.

What is claimed is:

1. A method of transmitting information over a packet data network comprising the steps of:
   receiving information as a first substantially continuous stream of bits from a sending device;
   reformatting said received information into packets;
   adding to each packet a tag indicative of a first amount of time taken to receive a portion of the continuous stream of bits contained within said packet from the sending device; and
   transmitting each of said packets over said packet data network.

2. The method of claim 1 further comprising:
   receiving said packets at a receiving node in said packet data network;
   reformatting said packets into a second substantially continuous stream of bits; and
   transmitting each portion of said second substantially continuous stream of bits to a destination device in a second amount of time that is, on average, equal to said first amount of time taken to receive a corresponding portion of said first substantially continuous stream of bits.

3. The method of claim 2 wherein said first and second substantially continuous streams of bits are indicative of a facsimile image.

4. The method of claim 3 wherein said second substantially continuous stream of bits also comprises bits not indicative of a facsimile image, said bits not indicative of a facsimile image being present in a quantity such that the first substantially continuous stream of bits and the second substantially continuous stream of bits are conveyed in substantially the same amount of time.

5. Apparatus for transmitting a facsimile image over a packet data network comprising:
   means for receiving a first substantially continuous bit stream from a sending device, the first substantially continuous bit stream including information bits indicative of said facsimile image and fill bits not indicative of said facsimile image;
   means for stripping said fill bits, arranging into packets said information bits indicative of said facsimile image, and for including within each packet a tag indicative of an amount of time taken by said means for receiving to receive a portion of the first continuous bit stream included in said packet from the sending device.

6. Apparatus of claim 5 further comprising means for transmitting said packets over said packet data network.

7. Apparatus of claim 6 further comprising means for receiving said packets transmitting over the data network, means for reading said tags, and means for reformatting the packets into a second continuous bit stream.

8. Apparatus of claim 7 wherein said second continuous bit stream comprises a number of fill bits which differs from that of said first continuous bit stream.

9. Apparatus of claim 7 further comprising means for buffering said second continuous bit stream in a buffer having a length which varies during transmission of said second continuous bit stream, and for adjusting an amount of fill bits in said second continuous bit stream in response to variations in said buffer.

10. Apparatus for transmitting a facsimile image, received from a data network, to a receiving facsimile machine over a circuit switched telephone connection, said apparatus comprising:
    means for receiving packets of information from said data network, each of said packets representing a portion of said facsimile image and a first amount of time required for communication of said portion of facsimile image as a first substantially continuous bit stream from a sending facsimile machine to a means for transmitting said packets of information to said data network;
    means for reformatting said packets into a second substantially continuous bit stream, said means for reformatting including means for adding fill bits sufficient to cause said second substantially continuous bit stream to occupy a second amount of time that is substantially equal to said first amount of time.

11. Apparatus of claim 10 further comprising:
    buffer for storing part of the second substantially continuous bit stream, said buffer having a length which may vary; and means for adjusting the number of fill bits in said second substantially continuous bit stream in response to variations in the length of the buffer.

12. A method of transmitting a facsimile image over a packet switched data network, comprising:
    at a first server,
        receiving over a first circuit switched telephone connection a first substantially continuous bit stream including information bits indicative of said facsimile image;
        reformatting said first bit stream into packets and adding a tag to each packet, said tag being indicative of a first amount of time taken to receive a portion of said first bit stream contained in said each packet from a sending facsimile machine; and
        transmitting said packets from said first server to a second server over said packet switched data network;
    at said second server:
        receiving said packets transmitted from said first server;
        reformatting said packets into a second substantially continuous bit stream; and transmitting each portion of said second bit stream to a receiving facsimile machine over a second circuit switched telephone connection in a second amount of time that is substantially equal to said first amount of time for a corresponding portion of said first bit stream.

13. The method of claim 12 wherein said first bit stream further comprises fill bits not indicative of said facsimile image.

14. The method of claim 13 further comprising a step of stripping, at said first server, said fill bits before said step of reformatting.

15. The method of claim 12 wherein said step of transmitting said second bit stream from said second server to said receiving facsimile machine comprises, when necessary, adding to said each portion of said second bit stream fill bits not indicative of said facsimile image so that said second amount of time is substantially equal to said first amount of time.

16. A method of transmitting a facsimile image, comprising:

transmitting, from a sending facsimile machine to a first server over a first circuit switched telephone connection, a first substantially continuous bit stream including information bits indicative of said facsimile image;

receiving, at said first server, said first bit stream;

formatting said first bit stream into packets and adding to each packet a tag indicative of a first amount of time taken to receive a portion of said first bit stream contained in said each packet from said sending facsimile machine;

transmitting said packets from said first server to a second server, over a packet switched data network;

receiving, at said second server, said packets;

reformatting, at said second server, said packets into a second substantially continuous bit stream;

transmitting, from said second server to a receiving facsimile machine over a second circuit switched telephone connection, each portion of said second bit stream in a second amount of time that is substantially equal to said first amount of time taken to receive at said first server a corresponding portion of said first bit stream; and receiving, at said receiving facsimile machine, said second bit stream.

17. The method of claim 16 wherein said first bit stream further comprises fill bits not indicative of said facsimile image.

18. The method of claim 17 further comprising a step of stripping, at said first server, said fill bits before said step of reformatting.

19. The method of claim 16 wherein said step of transmitting said second bit stream from said second server to said receiving facsimile machine comprises, when necessary, adding to said each portion of said second bit stream fill bits not indicative of said facsimile image so that said second amount of time is substantially equal to said first amount of time.

* * * * *